(12) United States Patent
Van Hall

(10) Patent No.: US 7,171,022 B2
(45) Date of Patent: Jan. 30, 2007

(54) COMMON METHOD FOR COMMUNICATING AREA INFORMATION

(75) Inventor: Richard C. Van Hall, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 764 days.

(21) Appl. No.: 10/002,159

(22) Filed: Dec. 5, 2001

(65) Prior Publication Data

US 2003/0106844 A1    Jun. 12, 2003

(51) Int. Cl.
*G06K 9/00* (2006.01)
(52) U.S. Cl. ...................... 382/101; 382/102
(58) Field of Classification Search ............. 382/101, 382/203, 293, 295, 297, 276, 277; 345/646, 345/647, 648, 441
See application file for complete search history.

(56) References Cited

U.S. PATENT DOCUMENTS

| | | | |
|---|---|---|---|
| 4,701,752 A * | 10/1987 | Wang | 345/655 |
| 5,097,533 A | 3/1992 | Burger et al. | |
| 5,134,669 A | 7/1992 | Keogh et al. | |
| 5,341,439 A | 8/1994 | Hsu | |
| 5,465,364 A | 11/1995 | Lathrop et al. | |
| 5,485,561 A * | 1/1996 | Iizuka et al. | 382/282 |
| 5,557,798 A | 9/1996 | Skeen et al. | |
| 5,671,442 A | 9/1997 | Feeney et al. | |
| 5,797,006 A | 8/1998 | Sitbon et al. | |
| 5,804,683 A * | 9/1998 | Usman et al. | 536/25.31 |
| 5,864,984 A * | 2/1999 | McNertney | 47/58.1 R |
| 5,968,138 A | 10/1999 | Clough | |
| 5,974,169 A | 10/1999 | Bachelder | |
| 6,049,636 A | 4/2000 | Yang | |
| 6,104,405 A * | 8/2000 | Idaszak et al. | 345/427 |
| 6,526,163 B1 * | 2/2003 | Halmann et al. | 382/128 |
| 6,685,642 B1 * | 2/2004 | Garg et al. | 600/443 |
| 6,729,544 B2 * | 5/2004 | Navon | 235/462.14 |
| 6,985,929 B1 * | 1/2006 | Wilson et al. | 709/217 |

FOREIGN PATENT DOCUMENTS

EP    0723250    7/1996

OTHER PUBLICATIONS

Document entitled "A First Course in Program Design using C" (3 pages) by John Morris and copyright 1997.
Document entitled "Postal Address Block Location in Real Time" by Paul W. Palumbo et al., pp. 34-42, Jul. 1992.
Document entitled "Form-Based Localization of the Destination Address Block on Complex Envelopes" by M. Wolf et al., pp. 908-913, Aug. 1997.

* cited by examiner

Primary Examiner—Jingge Wu
Assistant Examiner—Brian Le
(74) Attorney, Agent, or Firm—Greenblum & Bernstein, P.L.C.

(57) ABSTRACT

A method for providing a common framework for area of interest (AOI) specification and access. The method includes providing a first set of instructions which generates an area of interest (AOI) defined by a first geometric shape and defining the first geometric shape by one or more coordinates. The one or more coordinates are then converted to a second set of coordinates for use with a second set of instructions. The second set of coordinates is defined by a new AOI which includes information associated with the first set of instructions and which is interpreted by the second set of instructions.

6 Claims, 14 Drawing Sheets

COMMON METHOD FOR COMMUNICATING AREA INFORMATION

BACKGROUND OF THE INVENTION

1. Field of the Invention

The present invention generally relates to a method for communicating area information and, more particularly, to a method for providing a common framework for area of interest (AOI) specification and access.

2. Background Description

The proper sorting of mail such as, for example, envelopes of varying sizes, packages, magazines and the like, is critical to the stream of commerce as well as the dissemination of information, worldwide. To sort mail, several different scenarios are possible ranging from manual sorting to automated systems using optical character recognition software. In any of the scenarios it is important that the mail be sorted based on one of several different criteria, any of which will result in the proper dissemination of the mail. For example, the mail may be sorted via a bar code, address or other similar indicia, or it may be necessary to determine a return address or whether proper postage is placed on the mail. All of this information may be necessary for the efficient sorting and ultimate delivery and/or proper routing of the mail.

Currently, there are many producers and consumers which utilize various recognition systems based on area of interest (AOI). For example, there are producers which develop facing identification mark (FIM), stamp, meter mark bar code, destination address block (DAB) processing, return address block (RAB), cropping and other recognition based programs, to name a few. However, up to now, each of these functional units uses its own set of conventions for describing the area information. This, of course, causes integration difficulties and maintenance issues.

By way of example, an address block finder may describe an area as a four point non-axis aligned polygon. In contrast, an address block reader may require an axis aligned bounded box. This disparity of descriptive methods forces the higher level application to convert between the different methods for each provider/user pair. This is detailed and error prone work.

The present invention is directed to overcoming one or more of the problems as set forth above.

SUMMARY OF THE INVENTION

The present invention is directed to a method for communicating area information in a common framework. The method includes the steps of providing a first set of instructions which generates an area of interest (AOI) and which is defined by a first geometric shape. The first geometric shape is defined by one or more coordinates, preferably Cartesian coordinates. The method further includes converting the one or more coordinates associated with the first geometric shape to a second set of coordinates for use with a second set of instructions. The second set of instructions are different than the first set of instructions, and further generates a new AOI which includes information associated with the first set of instructions.

In embodiments, the new AOI associated with second set of instructions defines a second geometric shape which may be the same or different than the first shape. The shapes may be a bounding box, a rectangle, a parallelogram or a polygon, where the bounding box is more constrained than the rectangle, the parallelogram and the polygon. Points are used to define the shapes which may include distinct starting point, fast end point or a slow end point. The second shape may be rotated, scaled, translated, moved or mirrored about an axis in relation to the first shape.

In another aspect of the present invention, the method includes the steps of filling a handle with an initial area of interest (AOI) space associated with a first set of instructions. The initial AOI space can then be converted to a second AOI space associated with a second set of instructions. The second AOI space is accessed with the second set of instructions.

In still another aspect of the present invention, a system for communicating area information in a common framework is contemplated. The system includes a mechanism for:

(i) providing a first set of instructions which generate an area of information (AOI) and which is defined by a first geometric shape;

(ii) defining the first geometric shape by one or more coordinates; and (iii) converting the one or more coordinates associated with the first geometric shape to a second set of coordinates for use with a second set of instructions.

In this system, the second set of instructions are different than the first set of instructions, and the second set of coordinates further generates the AOI which includes information associated with the first set of instructions capable of being interpreted by the second set of instructions.

A machine readable medium containing code communicating area information in a common framework implementing the steps of the present invention is also contemplated herein.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
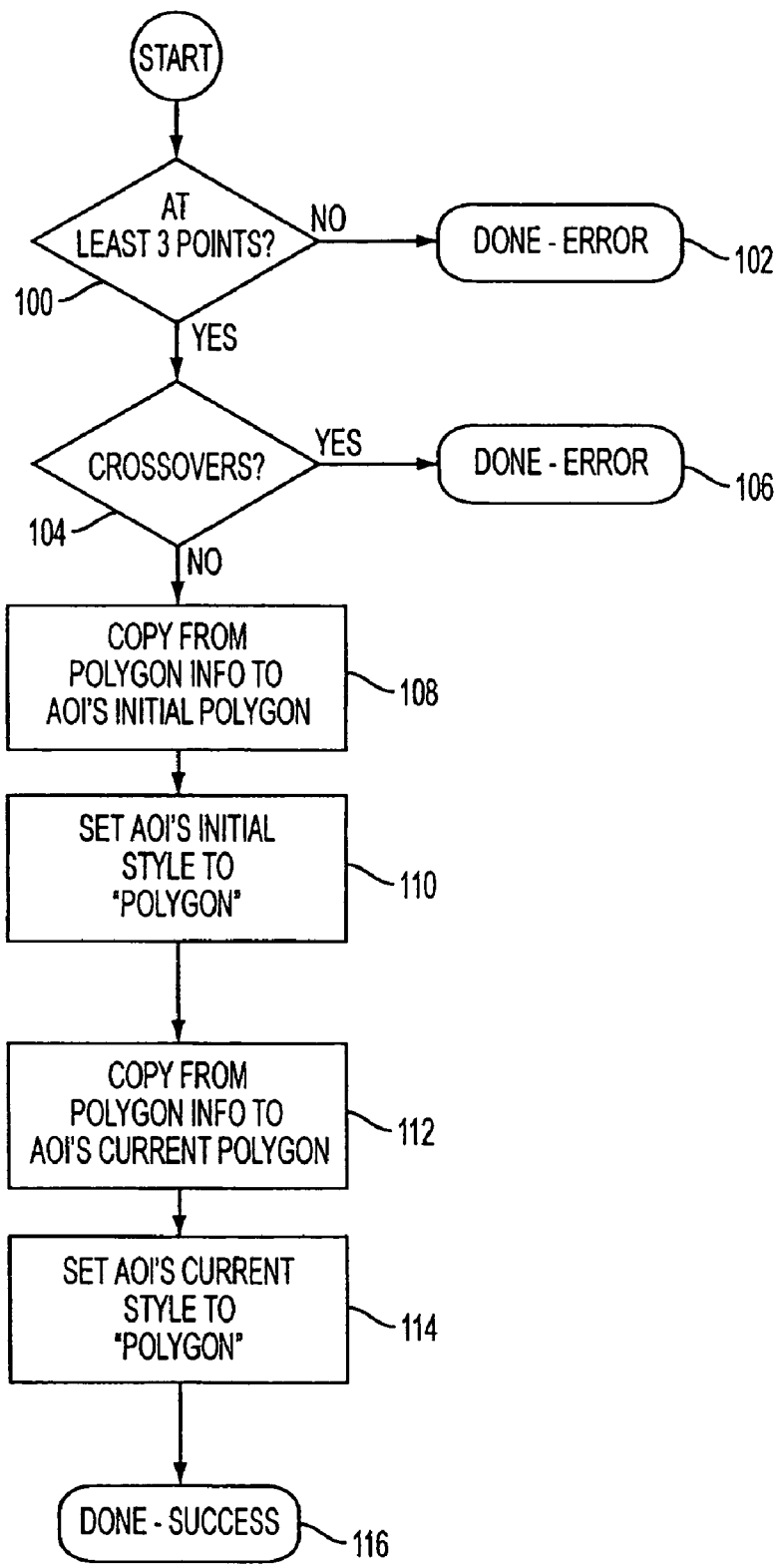
FIG. 1 is a flow diagram of a first example implementing the present invention.

The present invention is directed to a common framework for area of interest (AOI) specification and access. That is, the present invention, referred to also as an AOI Manager, provides a common framework so that different recognition AOI systems, each using its own set of conventions for describing area information, can be compatible with one another without the need for having a single convention. This is accomplished by:

1. Providing a standard set of AOI (e.g, bounding box, rectangle, parallelogram, polygon) that is a superset of the AOIs in current use.
2. Hiding the actual AOI data behind "handles"; all the conversions will be done by the AOI Manager.
3. Allowing users to continue their current AOI access/use assumptions by providing (i) ways for the user to inform the AOI Manager what those assumptions are (i.e., rotation direction) and (ii) various ways to access the data. An example is providing both rotation and orientation queries.
4. Completely decoupling the method in which an AOI is specified from the way in which it is accessed.

One example of the latter scenario includes making a CABProcessing (Candidate Address Block Processing) function that internally deals with the incoming AOIs only as (rotated) rectangles. This one CABProcessing function can then service both letter based ABL (Address Block Location) routines which supply bounding boxes and flats based ABL routines which supply polygon representations of (rotated) rectangles. This works because the AOI Manager allows an AOI to be queried out as any of four styles (e.g, bounding box, rectangle, parallelogram, polygon), as discussed in more detail below, no matter which of the four styles originally filled the AOI. In this example, the (rotated) rectangle query of the AOI filled with a bounding box will return a zero degree rotated rectangle that overlays the bounding box. The (rotated) rectangle query of the AOI filled with the polygon returns the (rotated) rectangle that best fits the polygon (best fit is defined as the smallest (rotated) rectangle that contains all the vertices and is parallel with the polygon's Fast Direction). (See FIGS. 10a through 13e.).

Routines Implemented by the Present Invention to fill the AOI Information

Once a handle has been created, it should be filled with an AOI space. To this end, the routines described below provide the user with four different ways to describe the AOI space. At the outset, it is noted that the routine used to fill the handle carries with it an implicit "Style" which is saved by the AOI Manager as both the "SetAsStyle" and "Current Style". Later routines may allow the user to change the "Current Style"; but the "SetAsStyle" should remain constant (unless the handle is filled again). In other words, in embodiments, the "SetAsStyle" can only be queried and thus cannot be changed except by refilling the AOI; however, the "Current Style" can be set and queried, at will. It is also noted that "GetSetAsStyle" retrieves the Style that the AOI was last filled with; whereas, "GetStyle" retrieves the Style that the AOI has last been explicitly set to by the present invention. If the style has not been explicitly set, the Style that the AOI was last filled with is returned.

The following are four routines contemplated for use with the present invention as the means of inputting an AOI. These routines are not the only routines which may be implemented by the present invention; that is, other routines may equally be used with the present invention, but the following routines are preferable for use with mail sorting systems. Also, the names and/or designations of the routines and functions, provided throughout the present description, are provided for illustrative purposes only and should not be interpreted as limiting the invention in any manner, whatsoever. The names and designations are merely provided for ease of understanding.

AOIManager_SetAsBoundingBox

The AOIManager_SetAsBoundingBox is an axis aligned rectangle and is described by (i) the start point which is, in embodiments, the visual upper left corner of the AOI, (ii) the end point which is, in embodiments, the visual lower right corner of the AOI, and (iii) RealityType, which indicates whether the AOI is in the 1, 3, 6, 8 set (REAL) or the 2, 4, 5, 7 (IMAGINARY) (as described in table 1 below).

AOIManager_SetAsRectangle

The AOIManager_SetAsRectangle is a rectangle but is no longer constrained to be axis aligned (although, in embodiments, it may still be axis aligned). The start point (visual upper left) and the fast end point (visual; upper right) describe the visual horizontal nature of the AOI while its visual vertical nature uses the RealityType and SlowLength parameters. The reason for the RealityType parameter is that there are two rectangles that share the same horizontal description. The RealityType parameter indicates whether the AOI is in the set of spaces previously described as orientations 1,3,6,8 (REAL) or orientations 2,4,5,7 (IMAGINARY).

AOIManager_SetAsParallelogram

The AOIManager_SetAsParallelogram is one step "looser" or less constrained than the rectangle. The angle between the visual horizontal and visual horizontal and visual vertical directions is no longer 90 degrees. Instead, a parallelogram is specified by three points.

Start Point—The visual upper left;

Fast End Point—The visual upper right; and

Slow End Point—The visual lower left.

AOIManager_SetAsPolygon

The AOIManager_SetAsPolygon has no geometric restrictions other than no crossovers are allowed (i.e., no figure "8's"). Instead of trying to deduce orientation information from the lines, this routine requires the user to specify this data independently of the polygon points. The fast direction (visual horizontal) and slow direction (visual vertical) parameters are supplied for this purpose. Note that on input, these parameters have no constraints (such as having unit length).

In this routine, the NumberofPoints and PointList parameters may be used by the caller to indicate the order in which the points are being presented, the number of vertices of the polygon, and the actual list of vertices, respectively. Note that the last vertex should preferably not be the same as the first vertex, i.e., the code closes the polygon, itself.

By way of illustration only, the following example shows the advantages of using the above routines to overcome the differences between semantic and syntactic expressions of a shape. (FIGS. 10a through 13e show further examples.) Suppose there is a first code which generates AOIs for use by a second code. The programmer of the first code knows that internally the code is finding rectangles. Yet, the method of storing these areas is by four corners (polygons). When it is time for the first code to save this area to an AOI, it would use the AOImanager_SetAsPolygon routine since it accepts a list of points. But at this point, the concept that this is supposed to be a rectangle has been lost. To correct this, the code could use the AOImanager_SetsStyle routine to change the style to AOImanager_Style EnumRectangle. Now, the users of this AOI will know "what" shape is being represented as opposed to "how" that shape is being represented.

It should be recognized that the AOIManager_GetAsPolygon would not necessarily return the same set of points as was supplied to the AOImanager_SetAsPolygon. This is because internally there is now a rectangle. If the user requests it as a polygon, the corners are calculated from the rectangle. This is shown graphically in FIGS. 10a through 13e. The original SetAs data is always the base from which the style is changed. Because of this, if one sets the style back to polygon in the above example, a polygon query would then return the original points.

Routines Implemented by the Present Invention to Query the Basic AOI Information The following set of routines allows the user to query the AOI as if it were any of the four AOI types described above.

AOIManager_GetAsBoundingBox

See the AOImanager_SetAsBoundingBox description above. Except for the handle, this routine is exporting rather than importing data.

AOIManager_GetAsRectangle

See the AOImanager_SetAsRectangle description above. Except for the handle, this routine is exporting rather than importing data.

AOIManager_GetAsParallelogram

See the AOIManager_SetAsParallelogram description above. Except for the handle, this routine is exporting rather than importing data.

AOIManager_GetAsPolygon

See the AOIManager_SetAsPolygon description above. It is noted that besides the handle, the "ClockwiseRotationFlag" and "StartCorner" parameters are also inputs to this routine. The "ClockwiseRotationFlag" allows the user to specify whether the PointList will be output in clockwise or counterclockwise order. The "StartCorner" allows the user to specify which point on the polygon is the first in the PointList. Also, note that the two direction vectors that are returned should preferably have magnitudes of 1.0.

It should now be understood that by using the present invention, it does not matter how the AOI was originally set since the AOI may be requested in any of the four representations. Of course, the area retrieved may change depending on how the AOI was originally filled (as well as if the style was explicitly set). By way of another example, the AOI may be requested in a more bounded form such as from an originally filled AOI with a polygon to a requested bounded box. In this example, the returned area would become larger as one moved from polygon (least constrained) to bounding box (most constrained). Of course, the AOI may also be requested in a less bound form such as from an originally filled AOI with a bounding box to a requested polygon. In this scenario, the returned area would stay the same as if the bounding box (most constrained) is moved to a polygon (least constrained). FIGS. 10a through 13e show the bounded areas of the different geometrical shapes utilized and converted by the present invention

Routines Implemented by the Present Invention to Query the Derived AOI Information All the information returned from the following routines may be calculated from the AOI information by the user. However, these routines provide a simpler and more consistent way for access to this information. In the following examples, the origin (0,0) is assumed to be at the upper left of the image.

In using the present invention, any routine that returns rotation information requires the caller to specify whether they want clockwise or counter-clockwise rotation to be positive. Any absolute rotation is with respect to the positive x-axis. The RealityType concept is required since rotation alone is not capable of describing AOIs when an X or Y mirror has been performed. In one representation, the REAL images have the user looking at a transparent picture from the front while IMAGINARY images have the user looking from the back. Orientations are defined in Table 1.

TABLE 1

| Orientation Number | View | View |
|---|---|---|
| 1 | $0^{th}$ buffer row is visual top | $0^{th}$ buffer column is visual left |
| 2 | $0^{th}$ buffer row is visual top | $0^{th}$ buffer column is visual right |
| 3 | $0^{th}$ buffer row is visual bottom | $0^{th}$ buffer column is visual right |
| 4 | $0^{th}$ buffer row is visual bottom | $0^{th}$ buffer column is visual left |
| 5 | $0^{th}$ buffer row is visual left | $0^{th}$ buffer column is visual top |
| 6 | $0^{th}$ buffer row is visual right | $0^{th}$ buffer column is visual top |
| 7 | $0^{th}$ buffer row is visual right | $0^{th}$ buffer column is visual bottom |
| 8 | $0^{th}$ buffer row is visual left | $0^{th}$ buffer column is visual bottom |

The Rotation with respect to Orientation concept is required since orientation by itself carries only 90 degree rotation resolution. Some examples include:

| Rotation | RotationReality | Orientation | OrientRotation |
|---|---|---|---|
| 0 clockwise (cw) | REAL (IMAGINARY) | 1 (4) | 0 cw |
| 0 counter clockwise (ccw) | | | 0 ccw |
| 10 cw | REAL (IMAGINARY) | 1 (4) | 10 cw |
| 350 ccw | | | −10 ccw |
| 20 cw | REAL (IMAGINARY) | 1 (4) | 20 cw |
| 340 ccw | | | −20 ccw |
| 30 cw | REAL (IMAGINARY) | 1 (4) | 30 cw |
| 330 ccw | | | −30 ccw |
| 40 cw | REAL (IMAGINARY) | 8 (5) | 40 cw |
| 320 ccw | | | −40 ccw |
| 50 cw | REAL (IMAGINARY) | 8 (5) | −40 cw |
| 310 ccw | | | 40 ccw |
| 60 cw | REAL (IMAGINARY) | 8 (5) | −30 cw |
| 300 ccw | | | 30 ccw |
| 70 cw | REAL (IMAGINARY) | 8 (5) | −20 cw |
| 290 ccw | | | 20 ccw |
| 80 cw | REAL (IMAGINARY) | 8 (5) | −10 cw |
| 280 ccw | | | 10 ccw |
| 90 cw | REAL (IMAGINARY) | 8 (5) | 0 cw |
| 270 ccw | | | 0 ccw |
| 100 cw | REAL (IMAGINARY) | 8 (5) | 10 cw |
| 260 ccw | | | −10 ccw |
| 110 cw | REAL (IMAGINARY) | 8 (5) | 20 cw |
| 250 ccw | | | −20 ccw |
| 120 cw | REAL (IMAGINARY) | 8 (5) | 30 cw |
| 240 ccw | | | −30 ccw |
| 130 cw | REAL (IMAGINARY) | 8 (5) | 40 cw |
| 230 ccw | | | −40 ccw |
| 140 cw | REAL (IMAGINARY) | 3 (2) | −40 cw |
| 220 ccw | | | 40 ccw |
| 150 cw | REAL (IMAGINARY) | 3 (2) | −30 cw |
| 210 ccw | | | 30 ccw |
| 160 cw | REAL (IMAGINARY) | 3 (2) | 20 cw |
| 200 ccw | | | 20 ccw |
| 170 cw | REAL (IMAGINARY) | 3 (2) | −10 cw |
| 190 ccw | | | 10 ccw |
| 180 cw | REAL (IMAGINARY) | 3 (2) | 0 cw |
| 180 ccw | | | 0 ccw |

-continued

| Rotation | RotationReality | Orientation | OrientRotation |
|---|---|---|---|
| 190 cw | REAL (IMAGINARY) | 3 (2) | 10 cw |
| 170 ccw | | | −10 ccw |
| 200 cw | REAL (IMAGINARY) | 3 (2) | 20 cw |
| 160 ccw | | | −20 ccw |
| 210 cw | REAL (IMAGINARY) | 3 (2) | 30 cw |
| 150 ccw | | | −30 ccw |
| 220 cw | REAL (IMAGINARY) | 3 (2) | 40 cw |
| 140 ccw | | | −40 ccw |
| 230 cw | REAL (IMAGINARY) | 6 (7) | −40 cw |
| 130 ccw | | | 40 ccw |
| 240 cw | REAL (IMAGINARY) | 6 (7) | −30 vw |
| 120 ccw | | | 30 ccw |
| 250 cw | REAL (IMAGINARY) | 6 (7) | −20 cw |
| 110 ccw | | | 20 ccw |
| 260 cw | REAL (IMAGINARY) | 6 (7) | −10 cw |
| 100 ccw | | | 10 ccw |
| 270 cw | REAL (IMAGINARY) | 6 (7) | 0 cw |
| 90 ccw | | | 0 ccw |
| 280 cw | REAL (IMAGINARY | 6 (7) | 10 cw |
| 80 ccw | | | −10 ccw |
| 290 cw | REAL (IMAGINARY) | 6 (7) | 20 cw |
| 70 ccw | | | −20 ccw |
| 300 cw | REAL (IMAGINARY) | 6 (7) | 30 cw |
| 60 ccw | | | 30 ccw |
| 310 cw | REAL (IMAGINARY) | 6 (7) | 40 cw |
| 50 ccw | | | 40 ccw |
| 320 cw | REAL (IMAGINARY) | 1 (4) | 40 cw |
| 40 ccw | | | 40 ccw |
| 330 cw | REAL (IMAGINARY) | 1 (4) | −30 cw |
| 30 ccw | | | 30 ccw |
| 340 cw | REAL (IMAGINARY) | 1 (4) | −20 cw |
| 20 ccw | | | 20 ccw |
| 350 cw | REAL (IMAGINARY) | 1 (4) | −10 cw |
| 10 ccw | | | 10 ccw |

Routines Implemented by the Present Invention to Change the AOIs Direction Information The following set of routines allows the user to easily re-orient AOIs. The routines do not rotate the AOI shape; instead, the data that represents the content's orientation is changed by the present invention. To understand this better, every AOI, no matter how it was filled or what the style has been set to, is basically represented internally by a starting point (corresponding to the visual upper left), a fast vector (corresponding to visual left to right), and a slow vector (corresponding to visual top to bottom). These are the items that are changed by the following routines in order to convert from one orientation or rotation to another. It should be noted by those of ordinary skill in the art that the names or designations of each of the following routines are merely provided for illustrative purposes and that any other names or designations may equally be used within the spirit of the present invention.

AOIManager__90Rotate

This routine rotates content by 90 degrees in the user specified direction. An example of 90 cw rotate may be:

| Before: | Boundbox-ULeft 0,0-LRight 5,1-REAL | Orient 1 |
|---|---|---|
| After: | Boundbox-ULeft 5,0-LRight 0,1-REAL | Orient 8 |

An example of 90 ccw rotate may include:

| Before: | Boundbox-ULeft 0,0-LRight 5,1-REAL | Orient 1 |
|---|---|---|
| After: | Boundbox-ULeft 0,1-LRight 5,0-REAL | Orient 6 |

AOIManager__180Rotate

This routine rotates content by 180 degrees. An example of 180 degree rotation may include:

| Before: | Boundbox-ULeft 0,0-LRight 5,1-REAL | Orient 1 |
|---|---|---|
| After: | Boundbox-ULeft 5,1-LRight 0,0-REAL | Orient 3 |

AOIManager__270Rotate

This routine rotates content by 270 degrees in the user specified direction. An example of 270 cw rotate may include:

| Before: | Boundbox-ULeft 0,0-LRight 5,1-REAL | Orient 1 |
|---|---|---|
| After: | Boundbox-ULeft 0,1-LRight 5,0-REAL | Orient 6 |

An example of 270 ccw rotate may include:

| Before: | Boundbox-ULeft 0,0-LRight 5,1-REAL | Orient 1 |
|---|---|---|
| After: | Boundbox-ULeft 5,0-LRight 0,1-REAL | Orient 8 |

AOIManager_MirrorAboutXAxis

This routine reverses (180 degrees) the direction of the slow vector. This operation is relative to the AOI's axes, not the image's axes. An example may include:

| Before: | Boundbox-ULeft 0,0-LRight 5,1-REAL | Orient 1 |
|---|---|---|
| After: | Boundbox-ULeft 0,1-LRight 5,0-IMAGINARY | Orient 4 |

AOIManager_MirrorAboutYAxis

This routine reverses (180 degrees) the direction of the fast vector. This operation is relative to the AOI's axes, not the image's axes. An example includes:

| Before: | Boundbox-ULeft 0,0-LRight 5,1-REAL | Orient 1 |
|---|---|---|
| After: | Boundbox-ULeft 5,0-LRight 0,1-IMAGINARY | Orient 2 |

AOIManager_FlipReality

This function changes reality from REAL to IMAGINARY or vice versa. This function may be identical to AOIManager_MirrorAboutXAxis.

AOIManager_SetReality

This function sets the reality to the specified value. This only causes change if the new reality is different from the current reality. The change is identical to AOIManager_MirrorAboutXAxis.

AOIManager_SetOrientation

This function sets the orientation to the specified value. This only causes change if the new orientation is different from the current orientation. An example may include setting the orientation to 6, as follows:

| | | |
|---|---|---|
| Before: | Boundbox-ULeft 0,0-LRight 5,1-REAL | Orient 1 |
| After: | Boundbox-ULeft 0,1-LRight 5,0-REAL | Orient 6 |

AOIManager_GetRotation

This function returns the rotation of the AOI with respect to the positive x-axis, in degrees. The rotation value will be between 0 and 360 degrees (0 and $2\pi$ radians)(i.e., no negative numbers). The user specifies whether the positive angle is clockwise (TRUE) or counter-clockwise (FALSE) as well as whether the rotation is returned in degrees or radians.

AOIManager_GetRotationReality

This function returns an enumeration with basically two legal values:

1. AOI Manager_RealityEnumReal (orientations 1,3,6,8)
2. AOI Manager_RealityEnumImaginary (orientations 2,4,5,7)

AOIManager_GetOrientation

This function determines the orientation that is the closest to describing the rotation and rotation reality of the AOI. It is somewhat problematic using orientation to describe rotation since orientation is basically an axis-aligned concept. But, if you expand an orientation to include a 90 degree pie slice from −45 to +45 degrees around that axis, it is still a useful concept.

AOIManager_GetRotationRelativeToOrientation

This function returns a value from −45 to +45 degrees (or $-\pi/4$ to $+\pi/4$ radians) which represents a RELATIVE amount of rotation from the axis and direction implied by orientation of an AOI. The user specifies whether the positive angle is clockwise (TRUE) or counter-clockwise (FALSE) as well as whether the angle is returned in degrees or radians.

AOIManager_GeometricRotateAOI

This function will rotate the shape of an AOI. This includes the fast and slow directions as well as all points. This will move the actual position of the points. The rotation is always around the origin (0,0) so that a user can translate the AOI to rotate around the origin and then translate back to the original location. This function will change the direction vectors.

AOIManager_GeometricTranslate AOI

This function will translate (move) an AOI in the X and Y directions. This is especially useful when rotating an AOI since the rotation always rotates around the origin. This function will not change the direction vectors since there is just a shifting of the points.

AOIManager_GeometricScale AOI

This function will scale the AOI in the X and Y directions. Direction vectors will be unaffected. A fractional scaling factor will shrink the AOI. The user can change the size in both the vertical (Y) and horizontal directions (X). Negative scaling has undefined behavior.

AOIManager_GeometricMirrorAboutXAxis

This function will mirror all of the points in the AOI (as well as the direction vectors) over the horizontal axis. This means that all points will have their Y components multiplied by −1.

AOIManager_GeometricMirrorAboutYAxis

This function will mirror all of the points in the AOI (as well as the direction vectors) over the vertical axis. This means that all points will have their X components multiplied by −1.

Processes Implementing the System and Method (Routines) of the Present Invention Referring now to the drawings, FIG. 1 shows a flow diagram of a first example implementing the present invention. FIG. 1 (as well as the remaining flow diagrams illustrated herein) may equally represent a high level block diagram of the system of the present invention. The steps of FIG. 1 (as well as the remaining flow diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

FIG. 1 shows a method implemented by the present invention which sets a polygon as provided by the routine AOIManager_SetAsPolygon. In step 100, a determination is made as to whether there are at least three points. This is used to determine if there is a polygon. If there are not at least three points, in step 102, an error is provided. If there are at least three points, in step 104, a determination is made as to whether there are any crossovers. If there are crossovers, in step 106, an error message is provided. If there are no crossovers, in step 108, a copy of polygon information is made to the AOI initial polygon. In step 110, the AOI initial style is set to "polygon". In step 112, the polygon information is copied to the AOI current polygon. In step 114, the "Current Style" AOI is set to "polygon. In step 116, the process is complete.

Figure 2:
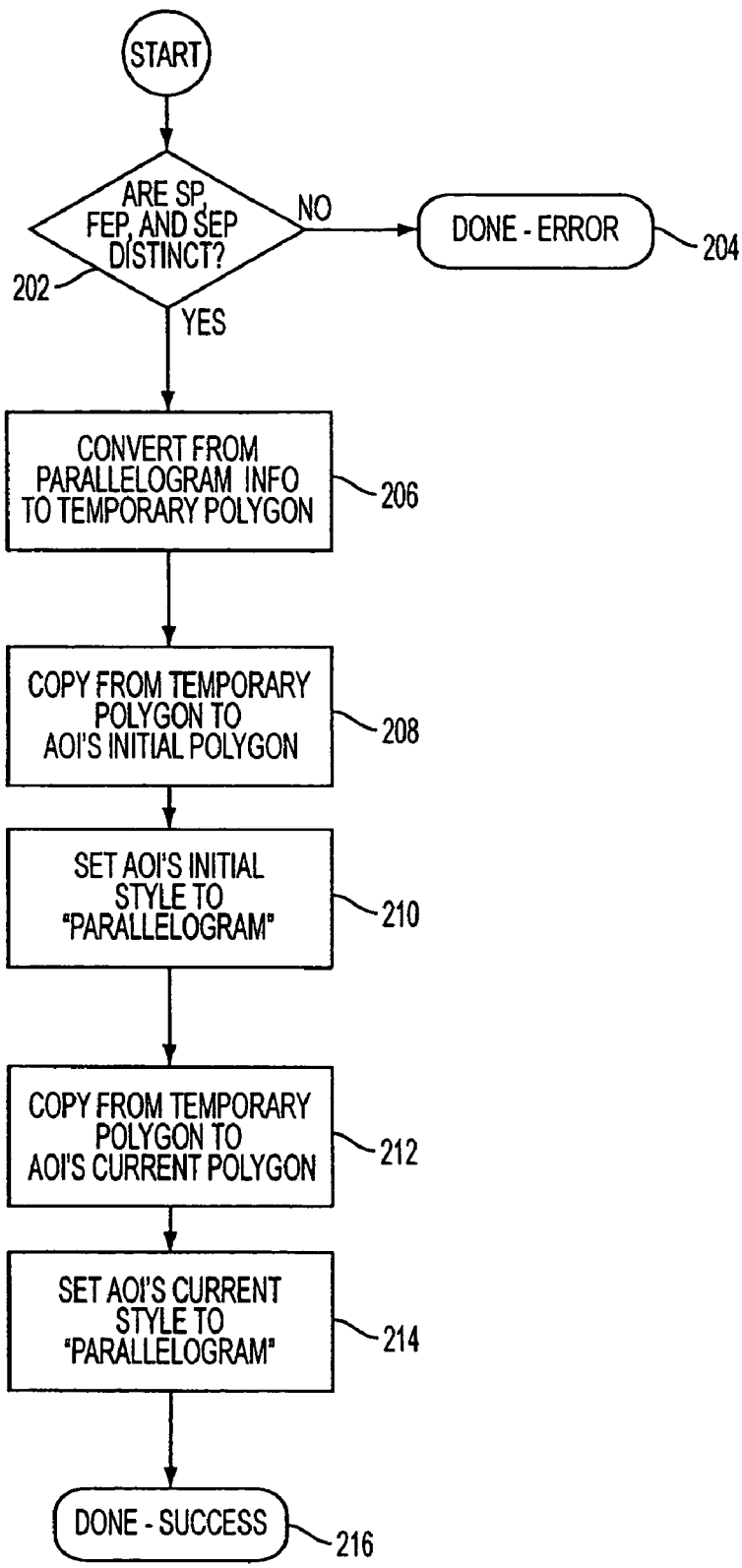
FIG. 2 is a flow diagram of a second example implementing the present invention.

FIG. 2 shows a method implemented by the present invention which sets a parallelogram provided by the routine AOIManager_SetAs Parallelogram. In step 202, a determination is made as to whether there is a distinct starting point (SP), fast end point (FEP) and a slow end point (SEP). As previously discussed, the FEP is a point at the visual rightmost horizontal point of interest and a SEP is a point at the visual leftmost vertical point of interest. If there are no distinct points, in step 204, an error is provided. If there is are distinct points, in step 206, the parallelogram information is converted to a temporary polygon. In step 208, the temporary polygon is copied to the AOI initial polygon. In step 210, the AOI initial style is set to "parallelogram". In step 212, a copy from the temporary polygon to the AOI current polygon is made. In step 214, the AOI "Current Style" is set to "parallelogram". In step 216, the process is complete.

Figure 3:
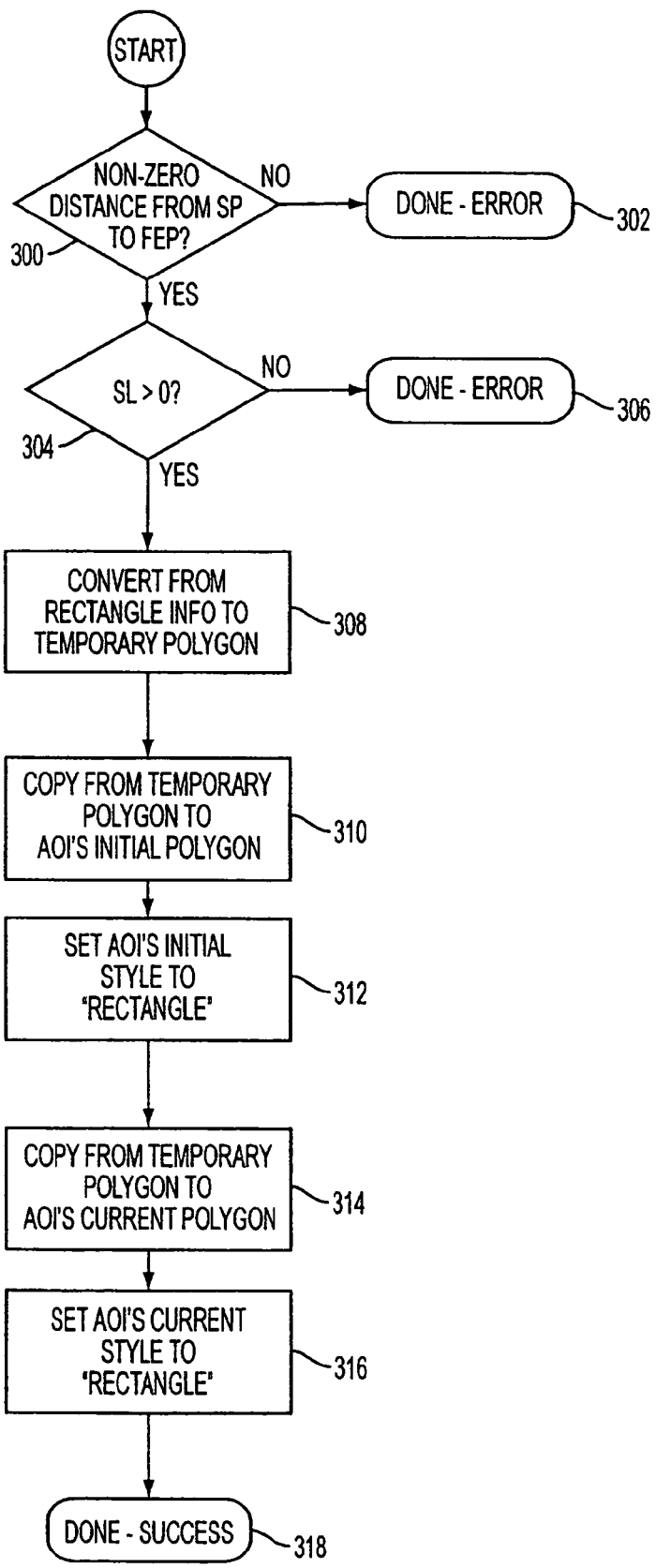
FIG. 3 is a flow diagram of a third example implementing the present invention.

FIG. 3 shows a method implemented by the present invention which sets a rectangle provided by the routine AOIManager_SetAsRectangle. In step 300, a determination is made as to whether there is a non-zero distance between the SP and the FEP. If no, then an error is provided in step 302. If there is a non-zero distance, in step 304,1 a determination is made as to whether the slow length (SL) is greater than 0. The SL is the distance from the lower left hand corner to the SP in the vertical direction. If the SL is not greater than 0, then an error is provided in step 306. If the SL is greater than 0, then the rectangle is converted to a temporary polygon, in step 308. In step 310, a copy of the temporary polygon is provided to the AOI initial polygon. In step 312, the AOI initial style is set to "rectangle". In step 314, a copy is made from the temporary polygon to the AOI current polygon. In step 316, the AOI "Current Style" is set to "rectangle". In step 318, the process ends.

Figure 4:
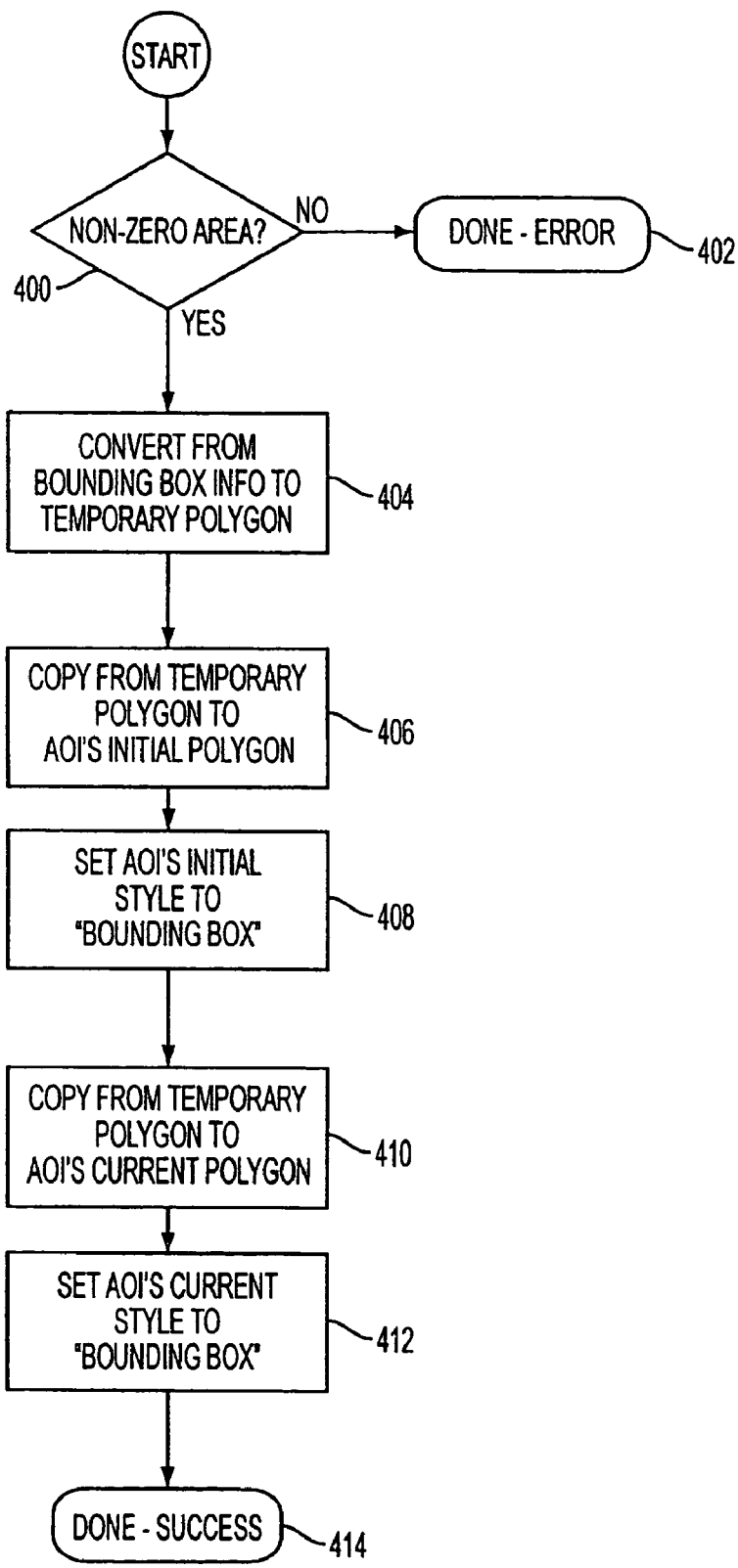
FIG. 4 is a flow diagram of a fourth example implementing the present invention.

FIG. 4 shows a method implemented by the present invention which sets a bounding box provided by the routine AOIManager_SetAsBounding Box. In step 400, a determination is made as to whether there is a non-zero area. If there is not a non-zero area, then an error is provided in step 402. If there is a non-zero area, in step 404, the bounding box information is converted to a temporary polygon. In step 406, a copy from the temporary polygon is made to the AOI initial polygon. In step 408, the AOI initial style is set to "bounding box". In step 410, a copy is made from the temporary polygon to the AOI current polygon. In step 412, the AOI "Current Style" is set to "bounding box". In step 414, the process is ends.

Figure 5:
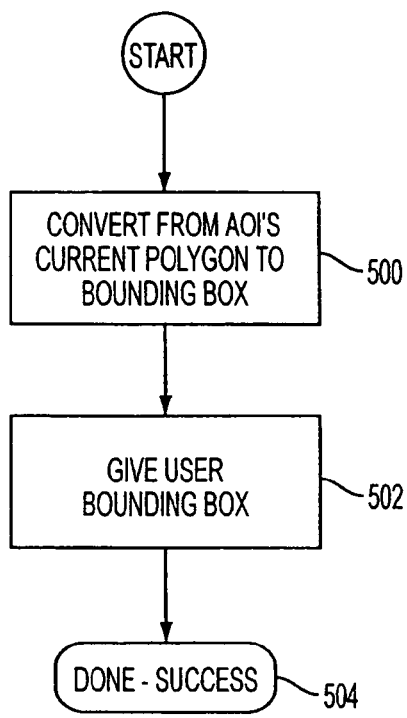
FIG. 5 is a flow diagram showing the implementation of a routine of the present invention.

FIG. 5 is a flow diagram which shows the implementation of the routine AOIManager_GetAsBoundingBox. In step 500, the AOI current polygon is converted to a bounding box. In step 502, a user is provided with the bounding box. In step 504, the process ends.

Figure 6:
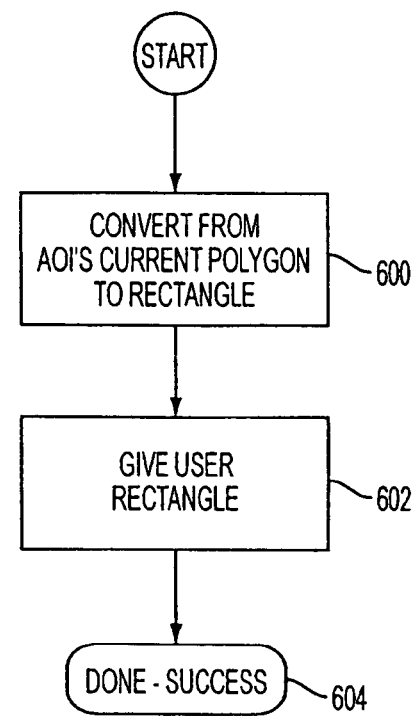
FIG. 6 is a flow diagram showing the implementation of a second routine of the present invention.

FIG. 6 is a flow diagram which shows the implementation of the routine AOIManager_GetAsRectangle. In step 600, the AOI current polygon is converted to a rectangle. In step 602, a user is provided with the rectangle. In step 604, the process ends.

Figure 7:
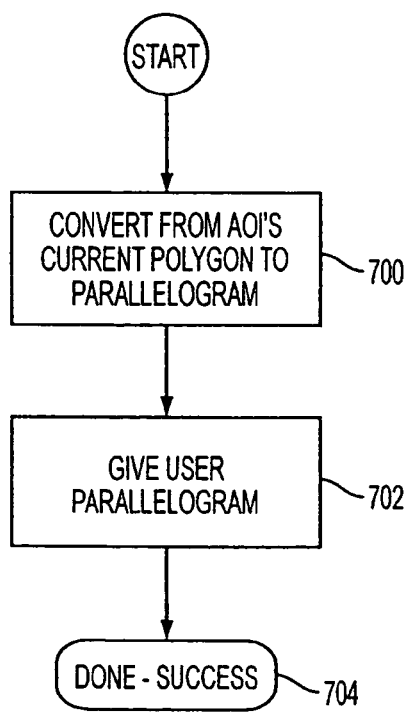
FIG. 7 is a flow diagram showing the implementation of a third routine of the present invention.

FIG. 7 is a flow diagram which shows the implementation of the routine AOIManager_GetAsParallelogram. In step 700, the AOI current polygon is converted to a parallelogram. In step 702, a user is provided with the parallelogram. In step 704, the process ends.

Figure 8:
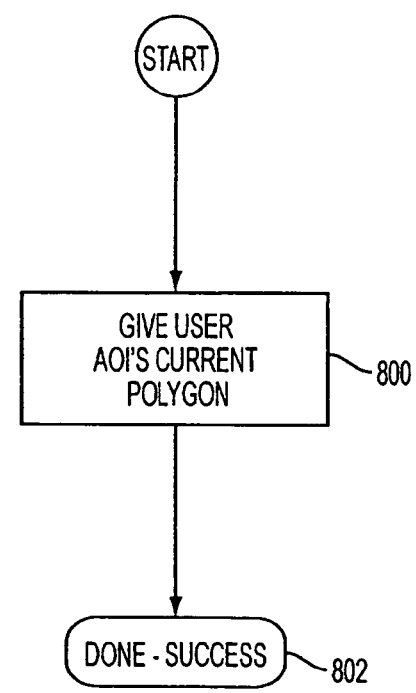
FIG. 8 is a flow diagram showing the implementation of a fourth routine of the present invention.

FIG. 8 is a flow diagram which shows the implementation of the routine AOIManager_GetAsPolygon. In step 800, a user is provided with the polygon. It is noted that only this step is necessary to implement the routine of FIG. 8 based on the fact that a polygon is a generic shape for the remaining shapes, i.e., bounding box, rectangle and parallelogram. In step 804, the process ends.

Figure 9:
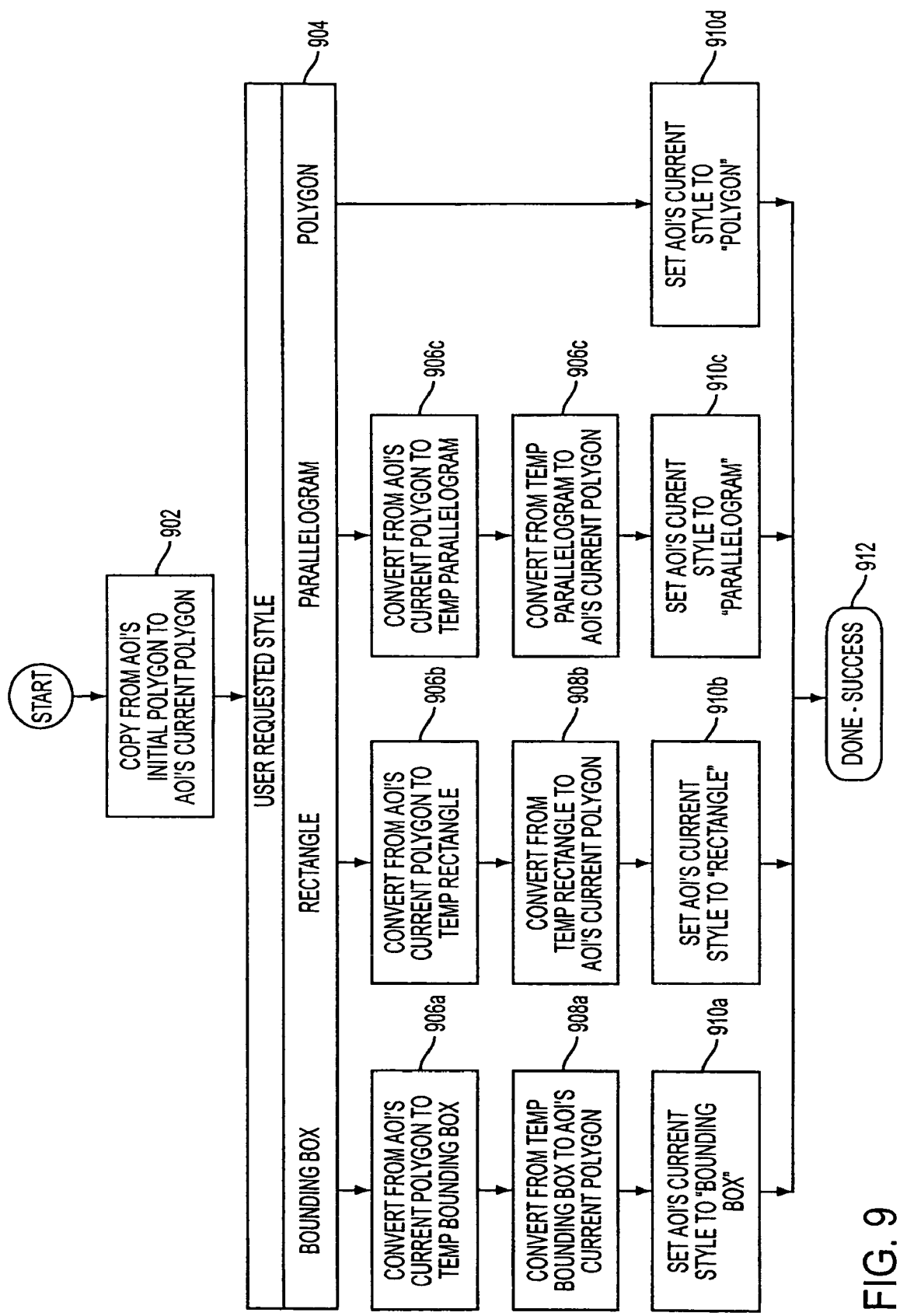
FIG. 9 is a flow diagram showing the implementation of a fifth routine of the present invention.

FIG. 9 is a flow diagram which shows the implementation of the routine AOIManager_SetStyle. In step 902, a copy is made from the AOI initial polygon to the AOI current polygon. In step 904, the user requests a style, i.e., bounding box, rectangle, parallelogram or polygon. If a bounding box is requested, in step 906a, the AOI current polygon is converted to a temporary bounding box. In step 908a, the temporary bounding box is converted to the AOI current polygon. In step 910a, the AOI "Current Style" is set to "Bounding Box". In step 912, the conversion is complete and the process ends.

Still referring to FIG. 9, if a rectangle is requested, in step 906b, the AOI current polygon is converted to a temporary rectangle. In step 908b, the temporary rectangle is converted to the AOI current polygon. In step 910b, the AOI "Current Style" is set to "Rectangle". In step 912, the conversion is complete and the process ends. If a parallelogram is requested, in step 906c, the AOI current polygon is converted to a temporary parallelogram. In step 908c, the temporary parallelogram is converted to the AOI current polygon. In step 910c, the AOI "Current Style" is set to "Parallelogram". In step 912, the conversion is complete and the process ends. If a polygon is requested, in step 910d, the AOI "Current Style" is set to "Polygon". In step 912, the conversion is complete and the process ends.

Figure 10A:
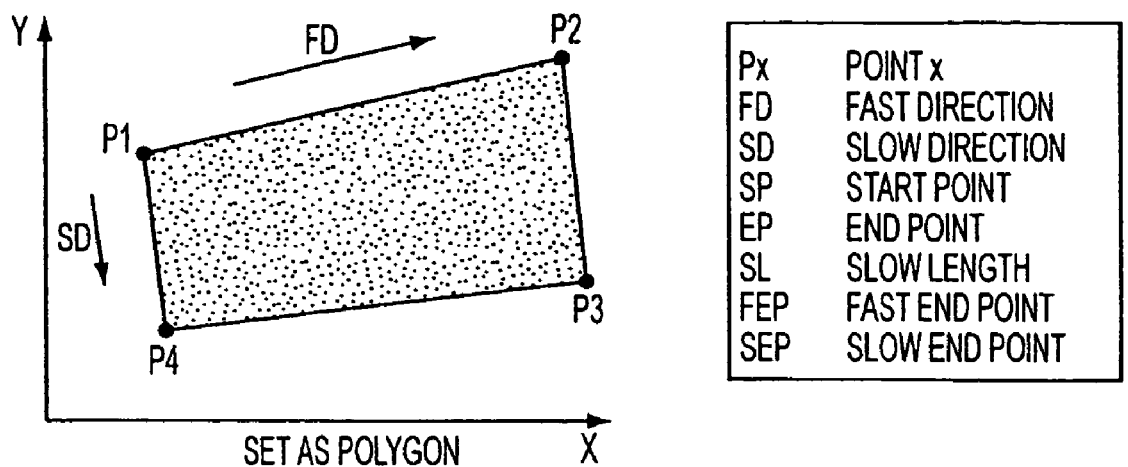
FIGS. 10a through 13e show the bounded areas of geometric shapes as described with reference to FIGS. 5 through 8.
Figure 10B:
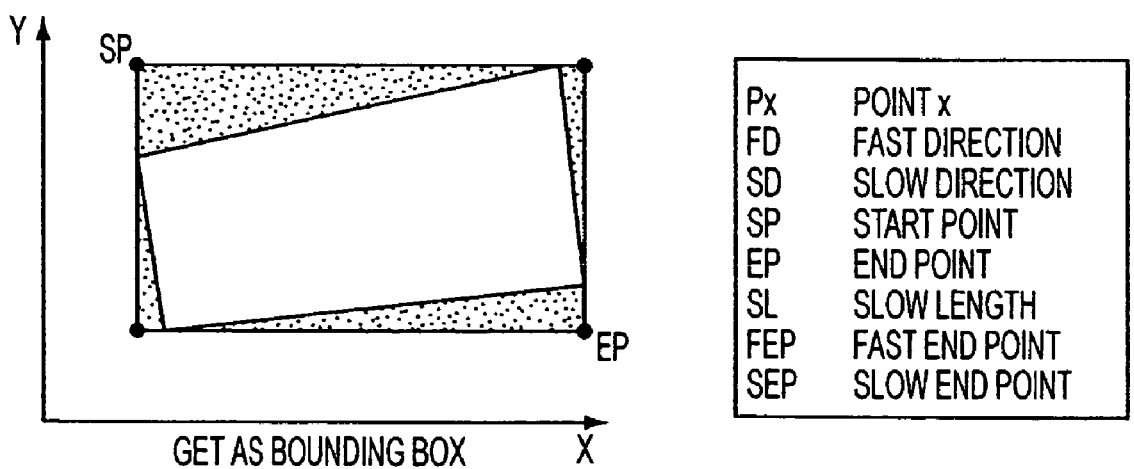
Figure 10C:
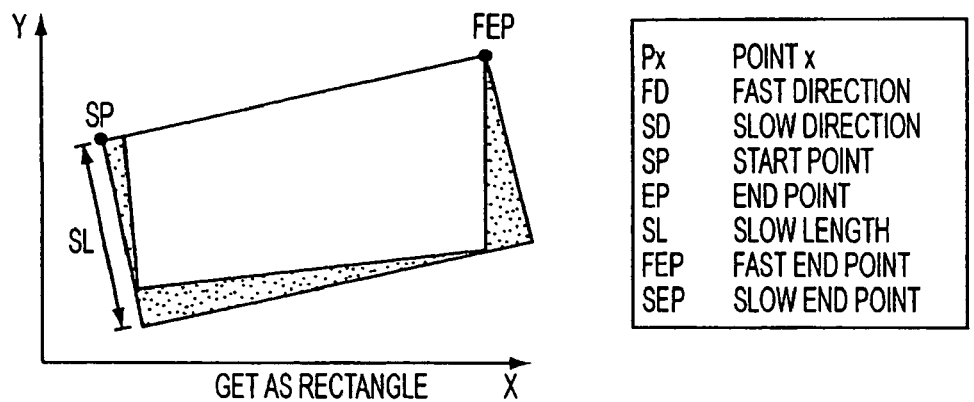
Figure 10D:
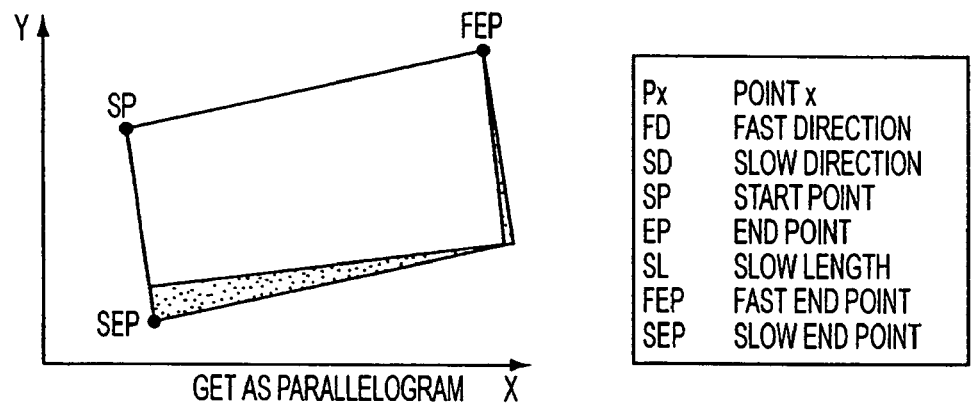
Figure 10E:
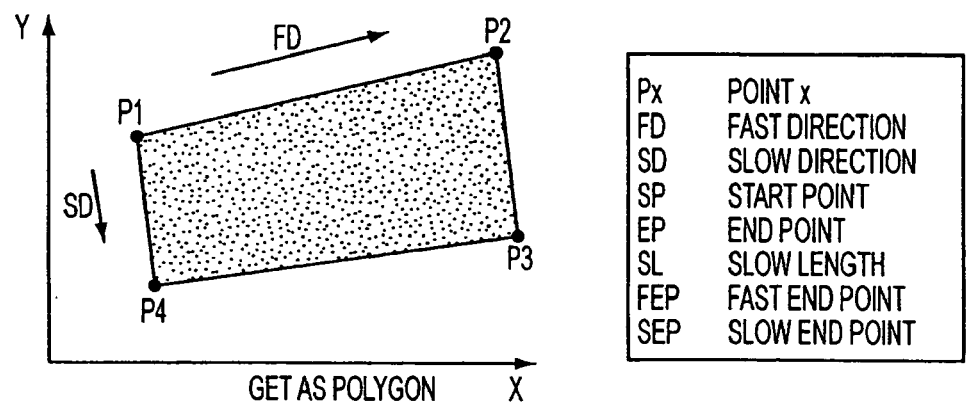

FIGS. 10a through 13e graphically show the bounded areas of the geometric shapes as provided in the AOIManager_SetAs and AOIManager_GetAs routines of FIGS. 5 through 8. Note that the initial polygon and the initial style remains unchanged by this function. This allows each call to SetStyle to always go back to the initial polygon as the basis for finding the tightest user requested shape which contains such shape. Specifically, FIGS. 10a through 10e show a conversion of a polygon to a bounding box (FIG. 10b), rectangle (FIG. 10c), parallelogram (FIG. 10d) or a polygon (FIG. 10e). In the Set As Polygon of FIG. 10a, there are four points, P1–P4. A fast direction (FD) is provided in the horizontal direction and the slow direction (SD) is provided in the vertical direction of the axially aligned graph. In the Get As Bounding Box of FIG. 10b, a start point (SP) is provided in the leftmost upper corner and an end point (EP) is provided in the rightmost lower corner. In the Get as Rectangle of FIG. 10c, the SP in the leftmost upper corner and the fast end point (FEP) in the uppermost right hand corner are provided in order to define the rectangular shape. In the Get As Parallelogram of FIG. 10d, a SP, FEP and a slow end point (SEP) are provided. The SEP is provided at the lowermost left hand corner. It is noted that the bounding box and the rectangle are both constrained examples of the parallelogram of FIG. 10d. Lastly, the Get As Polygon of FIG. 10e shows the same four points as shown in FIG. 10a.

As should be understood by those of ordinary skill in the art, the points shown in each of the FIGS. 10a through 10e are the minimum amount of points or parameters needed to define the axially aligned shapes of the bounding box, rectangle, parallelogram or the polygon. FIGS. 10a through 10e also illustrate the bounded areas of interest for the bounding box, rectangle parallelogram and polygon. The bounding box is provided with the greatest bounded form to the less bounded forms, in order, of the rectangle, parallelogram and polygon. Said otherwise, the polygon is the least constrained form and the bounding box is the most constrained form.

Figure 11A:
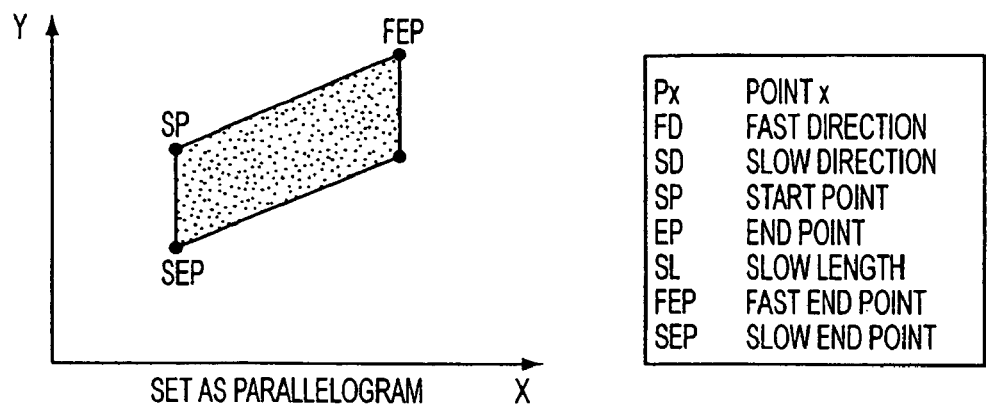
Figure 11B:
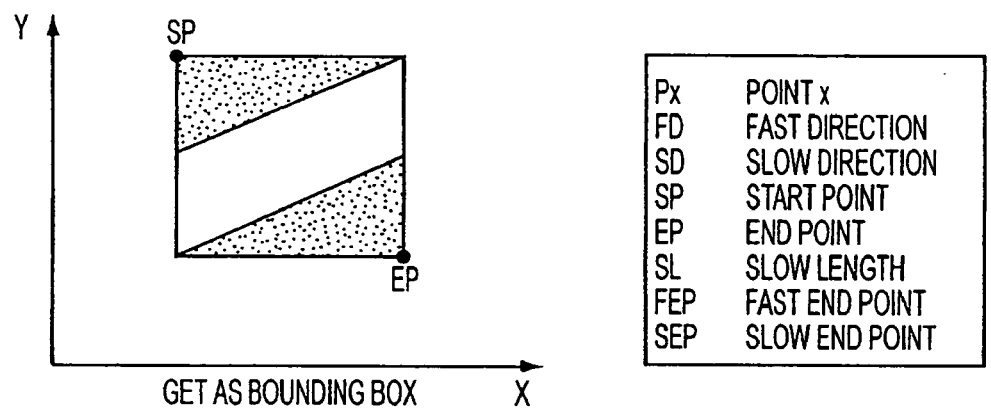
Figure 11C:
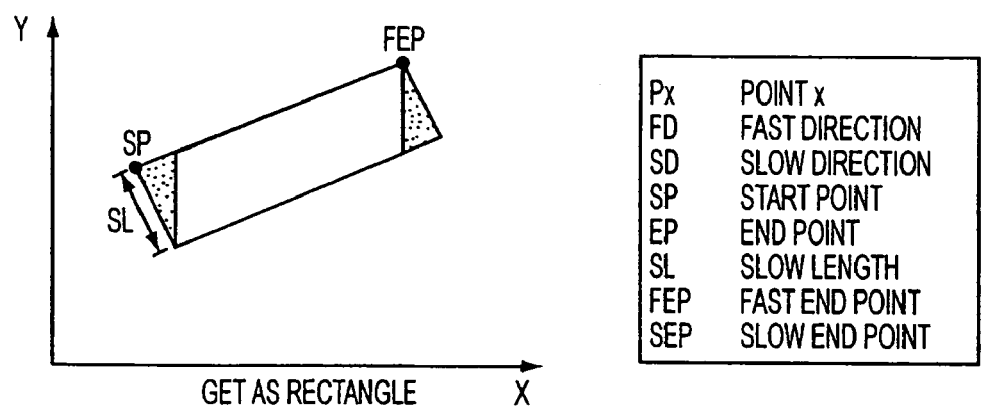
Figure 11D:
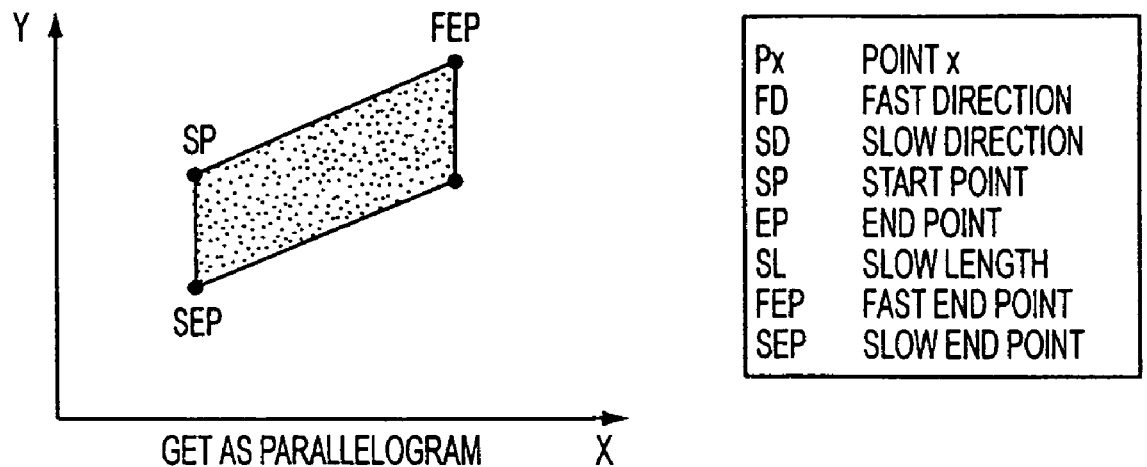
Figure 11E:
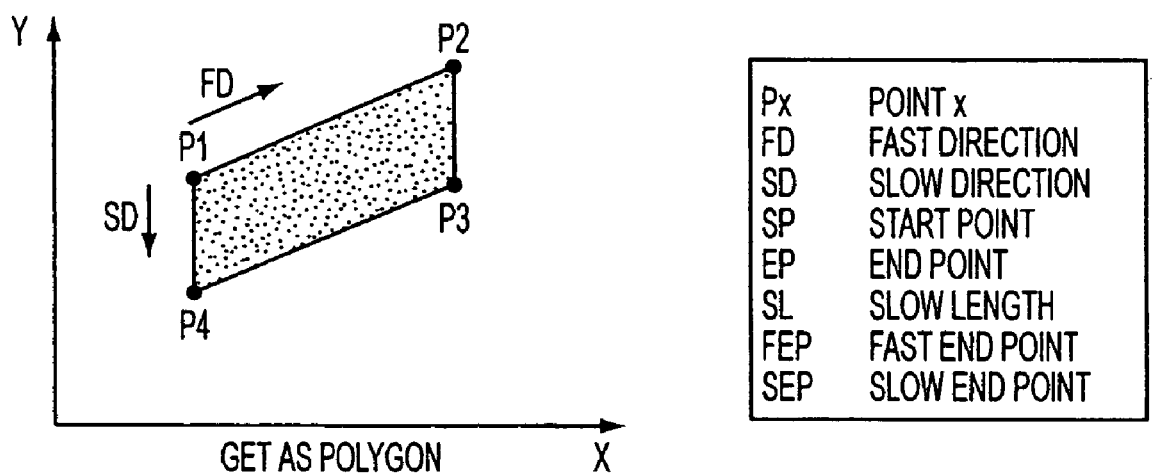
Figure 12A:
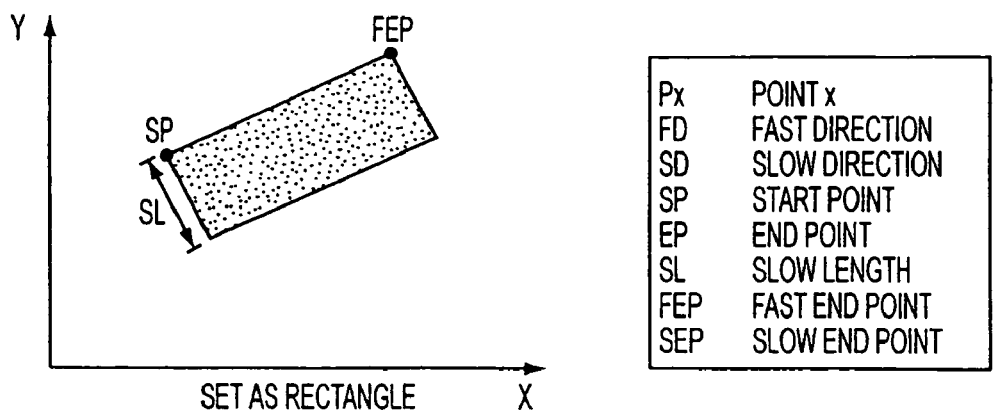
Figure 12B:
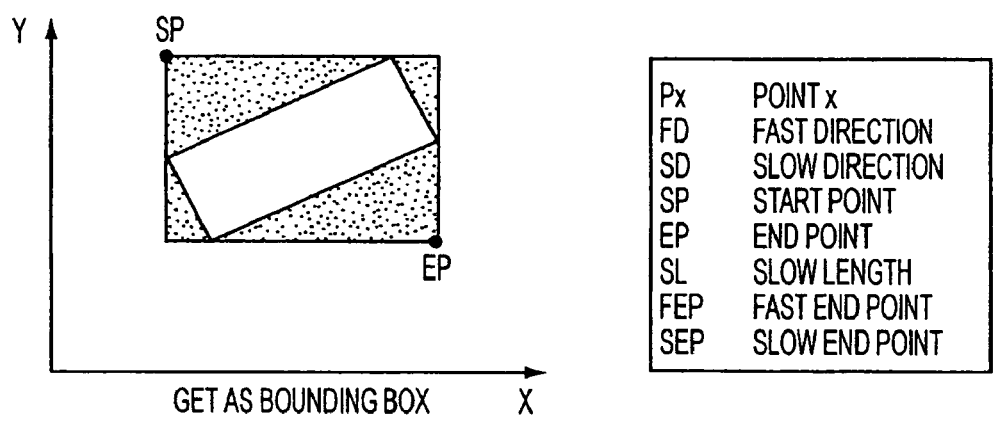
Figure 12C:
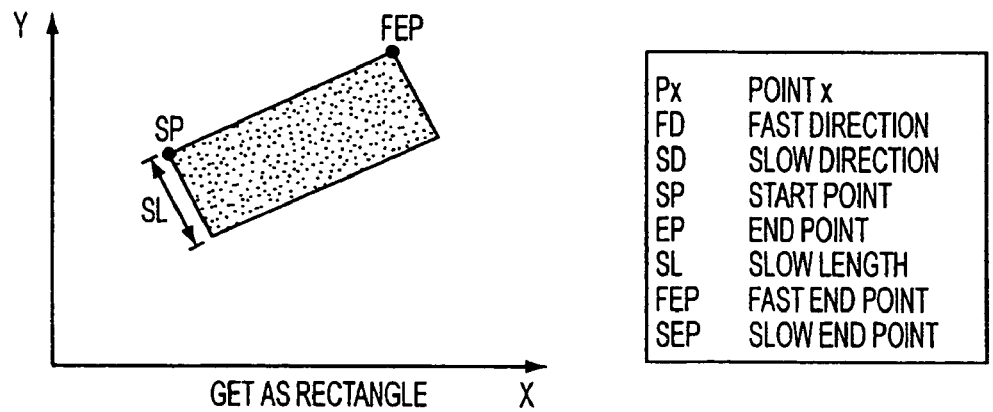
Figure 12D:
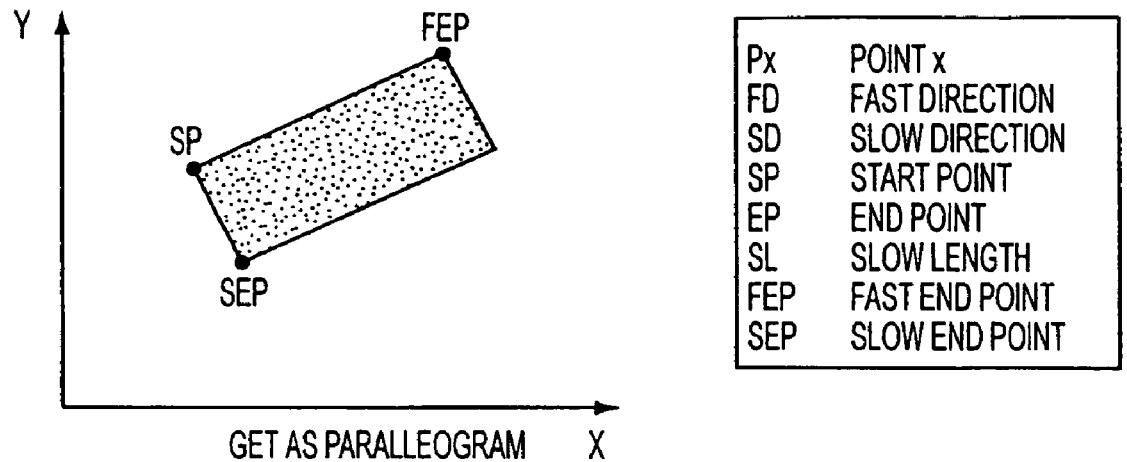
Figure 12E:
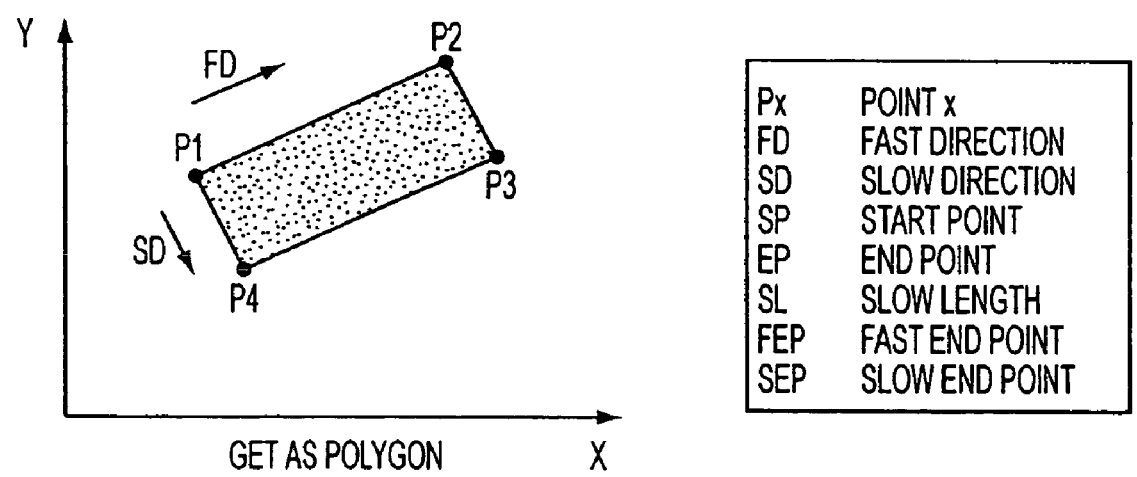
Figure 13A:
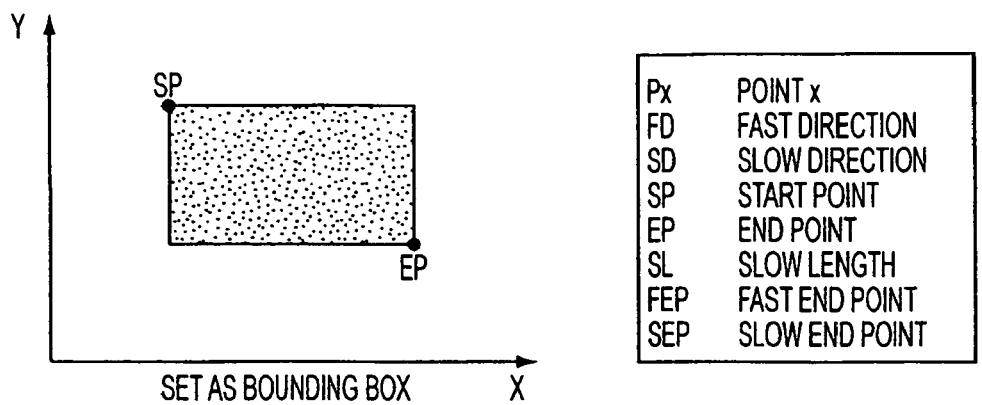
Figure 13B:
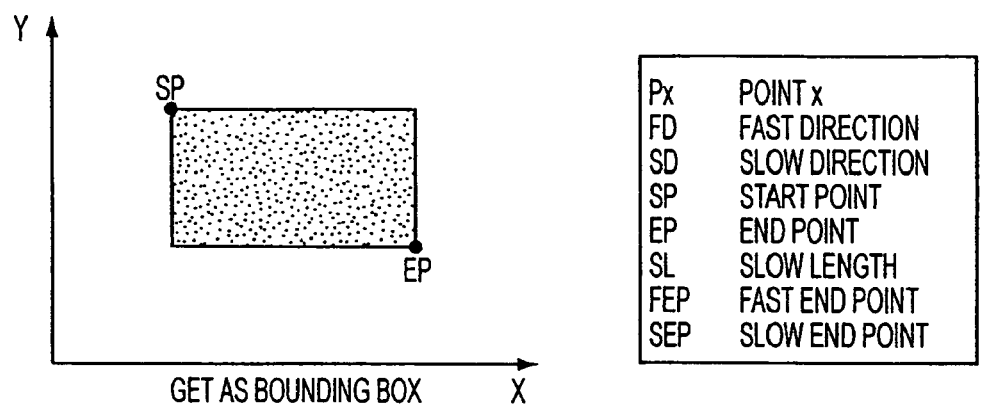
Figure 13C:
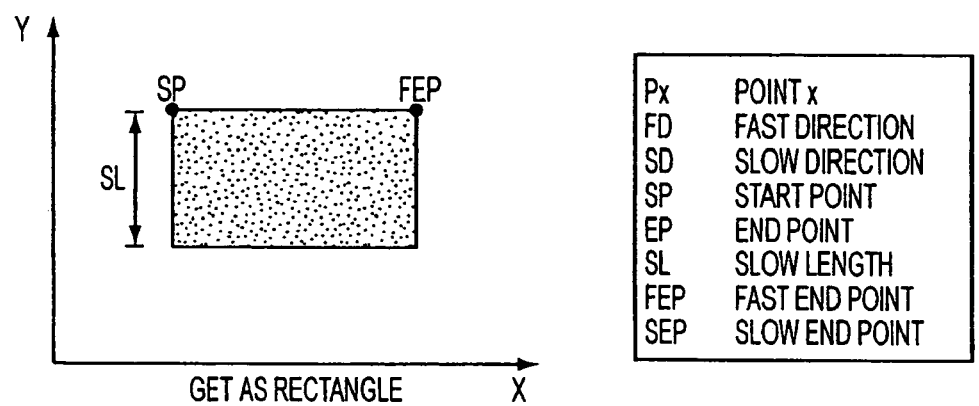
Figure 13D:
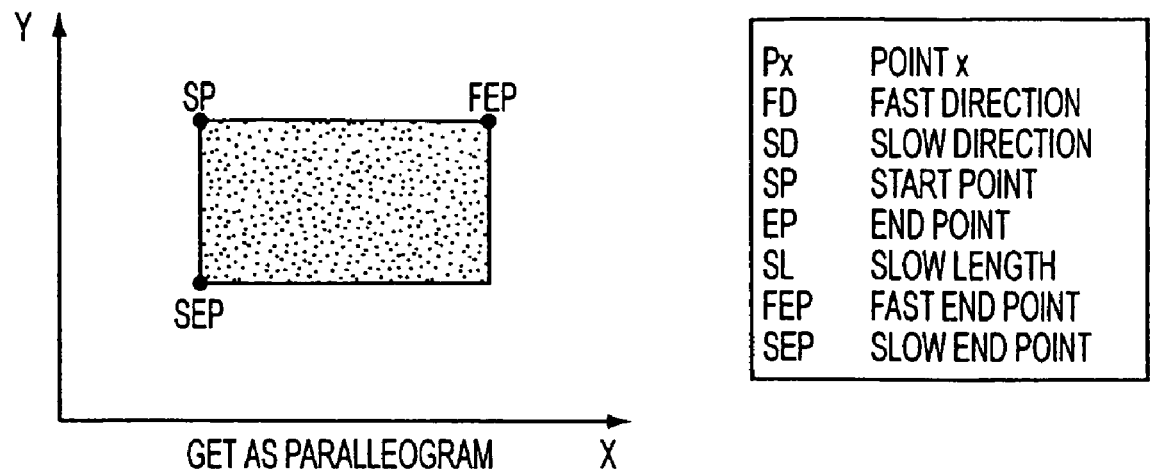
Figure 13E:
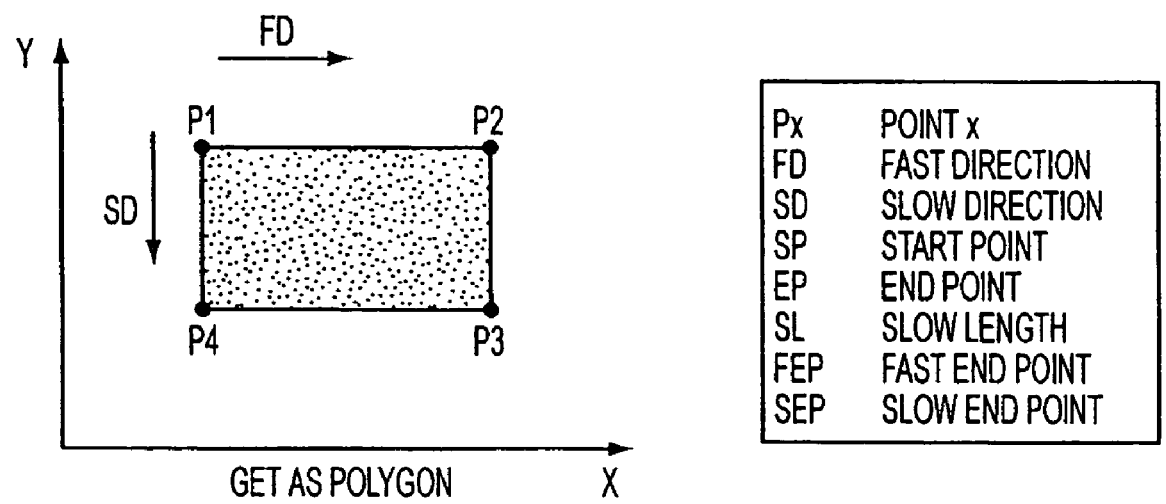

FIGS. 11a through 11e show a conversion of a parallelogram to a bounding box (FIG. 11b), rectangle (FIG. 11c), parallelogram (FIG. 11d) or a polygon (FIG. 11e). FIGS. 12a through 12e show a conversion of a rectangle to a bounding box (FIG. 12b), rectangle (FIG. 12c), parallelogram (FIG. 12d) or a polygon (FIG. 12e). Lastly, FIGS. 13a through 13e show a conversion of a bounding box to a bounding box (FIG. 13b), rectangle (FIG. 13c), parallelogram (FIG. 13d) or a polygon (FIG. 13e). It should now be well understood that FIGS. 13a through 13e illustrate that each area of interest will be the same size based on the fact that the bounding box initially has the greatest bounded form (i.e., area of interest). (The polygon is the least constrained form and the bounding box is the most constrained form.)

While the invention has been described in terms of preferred embodiments, those skilled in the art will recognize that the invention can be practiced with modification within the spirit and scope of the appended claims.

I claim:

1. A method for communicating area information in a common framework implemented on hardware, comprising the steps of:

providing to the hardware a first set of instructions which generates an area of interest (AOI) defined by a first geometric shape;

defining with the hardware the first geometric shape by one or more coordinates; and converting with the hardware the one or more coordinates to a second set of coordinates for use with a second set of instructions different than the first set of instructions, wherein the second set of coordinates is defined by a new AOI which includes information associated with the first set of instructions and which is interpreted by the second set of instructions, wherein the new AOI associated with second set of instructions define a second geometric shape, wherein the step of defining the first geometric shape includes the steps of determining whether the first geometric shape includes one of:
(i) at least three points;
(ii) a distinct starting point, fast end point and a slow end point;
(iii) a non-zero distance between a starting point and a fast end point; and
(iv) a non zero area, and
wherein after the determination of the first geometric shape, the method includes the steps of providing:
(i) the at least three points used to define a polygon;
(ii) the distinct starting point, fast end point and a slow end point used to define a parallelogram;
(iii) the non-zero distance between the starting point and the fast end point used to define a rectangle; and
(iv) the non zero area used to define a bounding box.

2. The method of claim 1, wherein after the determination that there are the at least three points, the method further comprises the steps of:
determining whether there are any crossovers; if there are no crossover then copying polygon information to the AOI; and
setting a current AOI to the polygon.

3. The method of claim 1, wherein after the determination that there are the distinct starting point, fast end point and slow end point, the method further comprises the steps of
converting parallelogram information to a temporary polygon;
copying the temporary polygon to an AOI initial polygon;
setting an AOI initial style to "parallelogram";
copying from the temporary polygon to an AOI current polygon; and
setting an AOI current style to the "parallelogram".

4. The method of claim 1, wherein after the determination that there is the non-zero distance, the method further comprising the steps of:
determining whether the slow length is greater than 0;
if the slow length is greater than 0, converting a rectangle to a temporary polygon;
copying the temporary polygon to an AOI initial polygon;
setting an AOI initial style to "rectangle";
copying the temporary polygon to an AOI current polygon; and
setting the rectangle in an AOI current style to the "rectangle".

5. The method of claim 1, wherein after the determination that there is the non-zero area, the method comprising:
converting bounding box information to a temporary polygon;
copying the temporary polygon to an AOI initial polygon;
setting an AOI initial style to "bounding box";
copying the temporary polygon to an AOI current polygon; and
setting an AOI current style to the "bounding box".

6. The method of claim 1, wherein the method is utilized in a mail sorting system.

* * * * *